United States Patent Office 2,742,361
Patented Apr. 17, 1956

2,742,361
FEED COMPOSITIONS

John Alfred Aeschlimann and Benjamin Tabenkin, Montclair, N. J., assignors to Hoffmann-La Roche Inc., Nutley, N. J., a corporation of New Jersey No Drawing. Application May 24, 1954,
Serial No. 432,022

7 Claims. (Cl. 99—4)

This invention relates to feed compositions containing growth promoting agents, more particularly, to animal and poultry feed compositions containing 3,4-dimethyl-5-sulfanilamido isoxazole and salts thereof.

Agents stimulating growth are frequently added to the feed ration of animals and poultry such as swine, ruminants and edible fowl in order to produce more rapid growth and greater feed efficiency than can be obtained on conventional diets. It has been found that 3,4-dimethyl-5-sulfanilamido isoxazole and salts thereof, soluble compounds readily absorbable from the alimentary tract, have a growth stimulating effect on animals and poultry when mixed with the basal ration.

The 3,4-dimethyl-5-sulfanilamido isoxazole may be incorporated in animal or poultry feeds or feed concentrates intended for chickens, turkeys, calves, pigs and the like in the form of the free compound or its organic or inorganic salts. These salts include the diethanolamine salt and alkali metal salts, such as the sodium and lithium salts. The growth promoting compound is intimately admixed with the animal or poultry feed in an amount of 0.01% to 1% by weight, based on the final feed composition. Animal feeds into which 3,4-dimethyl-5-sulfanilamido isoxazole or its salts may be incorporated in order to elicit a favorable growth response include chick starter, broiler and grower feeds, laying mashes, breeder and turkey breeder mashes, turkey starter and grower feeds, pig and sow feeds, hog feeds, hog supplements, cattle feed, calf feed, etc.

Other feed supplements, vitamins and amino acids, for example, may be included in the final feed composition if desired.

Example 1

50 grams of the sodium salt of 3,4-dimethyl-5-sulfanilamido isoxazole were thoroughly admixed with 250 grams of a feed composition comprising ground yellow corn, ground whole wheat, soy bean meal, dicalcium phosphate, calcium carbonate, iodized salt, cod liver oil, manganese sulfate quadri-hydrate, niacin, calcium pantothenate, riboflavin, vitamin K, and vitamin $B_{12}$. This admixture formed a first premix. The 300 grams of the first premix were then thoroughly admixed with an additional kilogram of the feed composition to form a second premix. The second premix, comprising 1,300 grams, was then admixed with 3,700 grams of the feed composition until thoroughly blended to provide 5 kg. of a fortified poultry feed.

Example 2

In the same manner as described in Example 1, 5 grams of the diethanolamine salt of 3,4-dimethyl-5-sulfanilamido isoxazole were thoroughly blended with 4,995 grams of the same poultry feed composition to form 5 kg. of a feed for poultry production.

Example 3

15 grams of 3,4-dimethyl-5-sulfanilamido isoxazole were blended in the same manner as described in Example 1 with 4,985 grams of "Start and Grow" chick mash (manufactured by GLF Feed Co-Operative Mills) comprising whole corn meal, flour midds, soy bean meal, ground oats, meat scrap, distillers solubles, alfalfa meal, dried whey, fish meal, dried skim milk, ground limestone, dicalcium phosphate, riboflavin concentrate, sodium chloride, cod liver oil, delsterol and trace minerals to form 5 kg. of a feed composition for baby chicks.

Example 4

A swine feed is prepared by blending, in the same manner as in Example 1, 50 grams of 3,4-dimethyl-5-sulfanilamido isoxazole with 4,950 grams of a pig and sow formula comprising ground yellow corn, wheat bran, wheat midds, ground whole oats, alfalfa meal, soy bean oil meal, meat scraps, tankage, steamed bone meal, ground limestone and salt.

We claim:

1. A feed composition containing a member of the group consisting of 3,4-dimethyl-5-sulfanilamido isoxazole and salts thereof.

2. An animal and poultry feed composition containing a minor proportion of 3,4-dimethyl-5-sulfanilamido isoxazole.

3. An animal and poultry feed composition containing a minor proportion of the sodium salt of 3,4-dimethyl-5-sulfanilamido isoxazole.

4. A composition according to claim 2 wherein the proportion of 3,4-dimethyl-5-sulfanilamido isoxazole is 0.01% to 1% by weight.

5. A composition according to claim 3 wherein the proportion of the sodium salt of 3,4-dimethyl-5-sulfanilamido isoxazole is 0.01% to 1% by weight.

6. A poultry feed containing 0.01% to 1% of 3,4-dimethyl-5-sulfanilamido isoxazole by weight.

7. A chick growing mash composition containing 0.01% to 1% of 3,4-dimethyl-5-sulfanilamido isoxazole by weight.

References Cited in the file of this patent

Tabenkin et al.: Reprint from Proceedings of Soc. for Exp. Biol. Med. (1953) vol. 83, 88–91, received for publication January 29, 1953.